United States Patent [19]

Fischer et al.

[11] Patent Number: 4,957,576

[45] Date of Patent: Sep. 18, 1990

[54] METHOD FOR PROTECTING LIGHT CONDUCTIVE FIBER ENDS PROJECTING FROM A FIBER REINFORCED PART

[75] Inventors: Manfred Fischer, Bremen; Bernd Hofer, Lemwerder, both of Fed. Rep. of Germany

[73] Assignee: MBB GMBH, Bremen, Fed. Rep. of Germany

[21] Appl. No.: 275,758

[22] Filed: Nov. 23, 1988

[30] Foreign Application Priority Data

Nov. 27, 1987 [DE] Fed. Rep. of Germany ....... 3740272

[51] Int. Cl.[5] ...................... B29C 63/18; B29C 65/54; G01B 11/16
[52] U.S. Cl. ................................. 156/166; 156/294; 156/296; 250/227.15; 350/96.1; 350/96.2; 350/96.24; 356/237
[58] Field of Search ............... 156/293, 294, 145, 158, 156/296, 303.1, 166; 350/96.20, 96.24, 96.10; 73/800; 250/227, 227.15; 356/32, 237

[56] References Cited

U.S. PATENT DOCUMENTS

| 4,221,962 | 9/1980 | Black et al. | 250/227 |
|---|---|---|---|
| 4,537,469 | 8/1985 | Kircher | 350/96.24 |
| 4,581,527 | 4/1986 | Crane et al. | 350/96.1 |
| 4,603,252 | 7/1986 | Malek et al. | 250/227 |
| 4,629,318 | 12/1986 | Malek et al. | 356/237 |
| 4,772,092 | 9/1988 | Hofer et al. | 350/96.24 |
| 4,867,820 | 9/1989 | Jacobson et al. | 156/294 |

FOREIGN PATENT DOCUMENTS

| 0579782 | 9/1976 | Switzerland | 350/96.24 |
|---|---|---|---|
| 2136119 | 9/1984 | United Kingdom | 356/237 |

*Primary Examiner*—Michael W. Ball
*Assistant Examiner*—Steven D. Maki
*Attorney, Agent, or Firm*—Ralf H. Siegemund

[57] ABSTRACT

Light conductive fibers being embedded as crack monitors in reinforced compound material are protected as follows. During laminate assembly the fiber ends are slipped into relatively short teflon hoses but being provided to be at least in parts embedded in the compound parts to be made; the ends of the hoses that will be embedded are closed with a cold curing laminate resin; the fiber ends with enclosing teflon hoses will be threaded through laminate openings during assembly of the lamination, and the fiber ends with projecting hoses are also inserted in a conical bore of an assembly device; open areas and portions of the compound part adjacent to the conical bore of the assembly tool are filled with laminate resins; a protective cover is then placed onto said bore and over the teflon hose protected fiber ends prior to curing of the part; and the thus prepared part is cured in an autoclave.

2 Claims, 2 Drawing Sheets

METHOD FOR PROTECTING LIGHT CONDUCTIVE FIBER ENDS PROJECTING FROM A FIBER REINFORCED PART

BACKGROUND OF THE INVENTION

The present invention relates to improvements for making fiber reinforced compound material and more particularly the invention relates to improvements about monitoring the integrity of such parts under utilization of embedded light wave conductors and optical filaments. The invention relates specifically to the external accessability of such light conductor fibers being embedded for purposes of monitoring the development of cracks in the fiber reinforced compound material.

Generally speaking it is known to embed light conductor fibers in structural materials including particularly fiber reinforced compound materials and to inspect whether or not light is conducted adequately and unimpeded through the fiber optic, under the assumption that in the case a crack develops the optical path will be interrupted. Obviously prior to such a response the optical fiber element must be without impairment as to its capability of conducting light. Devices of this type are for example disclosed in U.S. Pat. Nos. 4,772,092, 4,629,318 and others listed in the latter patents.

It was found however that the external accessability of such fibers i.e. their projection from the parts in which most of the fibers are embedded presents problems since these delicate indicators impede the processing and working of the construction part unless special steps are taken to protect the external portion of the light conducting fiber. Moreover, it has to be considered that e.g. the construction part needs curing when otherwise is assembled including the embedment of the light conducting fiber and the curing may require exposure to high pressure and/or high temperature in an autoclave. Again it is obvious that the optical element must not be damaged by this procedure. It was found, however, that special protection is needed. Otherwise the integrity of the crack monitor is not guaranteed.

DESCRIPTION OF THE INVENTION

It is an object of the present invention to provide a new and improved equipment and method for external accessability of light conducting fibers embedded in structural material to make sure that these fibers are not damaged during processing.

In accordance with the preferred embodiment of the present invention the following procedure is suggested. The optical fiber portion that will protect from the compound material is inserted in a polytetrafluoroethylene hose a portion of which can be clamped by and embedded in lamina of the fiber reinforced material. The internal hose opening is closed with a cold curing resin as it is used for making laminated parts. The hose with optical fiber inserted is inserted in and threaded through a conical bore of a tool part. A portion of that bore as well as the area or opening of the component from which the fiber optic is filled with laminating resin and then the part is cured in an autoclave under utilization of a cover which keeps the pressure away from the Teflon hose.

It was found that the inventive procedure and the equipment used in practicing the invention guarantees integrity of the optical fiber particularly to the extent it projects from part of structural material. This means that the particular fiber can later on readily be connected to a light supply source and transmitter and/or to pick-up or receive. The pressure device or tool mentioned protects the fiber portion inserted in the conical bore, the protection being particularly effective during the curing in the autoclave. As stated, this bore remains pressure-free as far as the autoclave is concerned or at least the pressure is drastically reduced as compared with the autoclave pressure, owing to the additional cover that is put on top of the tool. This cover, moreover, will stop any resin flow in or near the location where the fiber emerges from the lamina. Otherwise, if such resin were permitted to flow in a hollow space it may, during the ensuing curing, glue the fiber ends in an undesirable fashion. Fixing the fiber ends as well as the prevention of resin flow in cavities is the main aspect of using resin, basically to ensure the integrity of the fiber ends provided of course the casting resin is sufficiently resistant against high temperature and pressure as it is practiced in the autoclave. It is for this reason that it is of advantage to use a casting and laminating resin of sufficient temperature resistance which offers the added advantage that the laminated structure of the part itself is not interfered with.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

In FIG. 2 the fibers are angled off, in FIG. 3 they emerge straight;

Proceeding to the detailed description of the drawings, FIG. 1 illustrates a tool namely a pressure device 10 being generally of a flat construction and having a conical bore 11 merging on one (narrow) side with a lateral extending indent 12. This indent will be located on the outside, i.e. surface 10a is going to face the construction part from which a fiber optic or several fiber optic elements emerge. The cone angle alpha vis-a-vis a vertical is between 2 and 5 degrees, in other words the cone apex angle is between 4 and 10 degrees.

Figure 1:
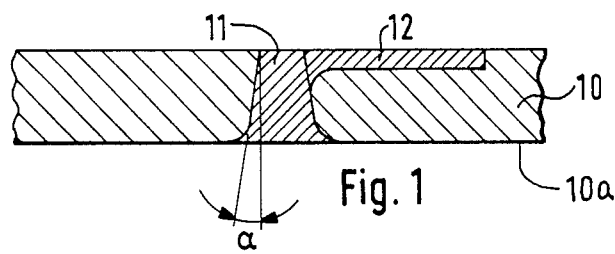
FIG. 1 is a cross section through a pressure taken up tool used in practicing the invention.

In order to manufacture a laminated fiber reinforced compound part lamina will be placed on part 10 serving as an assembly tool. Light conductive fibers will be embedded for purposes of monitoring formation of any crack. In preparation for this the tool device 10 is mounted on two supports 15 and 16 such that the wide opening of the cone faces up which is upside down as compared with FIG. 1. The surface 10a faces up accordingly individual layers, so called pre-peg lamina or layer i.e. the laminated elements will be placed on top of this assembly tool 10 as so positioned, and light conductive fibers such as 19 will be strategically placed e.g. in patterns as shown in the above identified patents.

In particular there is a layer or lamina 17 shown somewhat schematically and having an opening 18 for access of the light conductive fibers 19. Reference numeral 21 illustrates another lamina and there are as many lamina as deemed necessary. These fibers 19, to the extent they project from the opening 18, are run into the conical bore 11 of this tool part 10 and through the openings in the lamina such as 18. Openings 18 and bore 11 are aligned.

Teflon hoses such as 20 will be or have been stripped onto these light conductive fibers 19 to the extent they project through the opening 11 and out of the tool 10 but the hose protection extends also a considerable portion into the laminate construction which in this case is between the two layers 17 and 21. These teflon hoses have an outer diameter between 0.8 and 0.9 mm and an inter diameter between 0.3 and 0.5 mm. Preferably the fibers 19 with protective hoses 20 are threaded through opening 18 and 11 by means of a needle. The fiber ends should be suitably marked through numbers and/or colors and/or letter codes. Also the lengths of the hoses 20 can be used as an indication of the fibers' identity, location etc.

Figure 2:
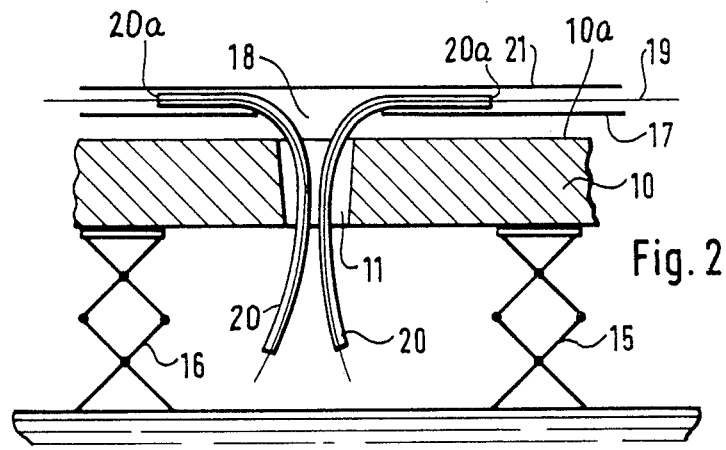
FIG. 2 is a schematic section view showing the practicing the inventive method particularly during laminating process.
Figure 3:
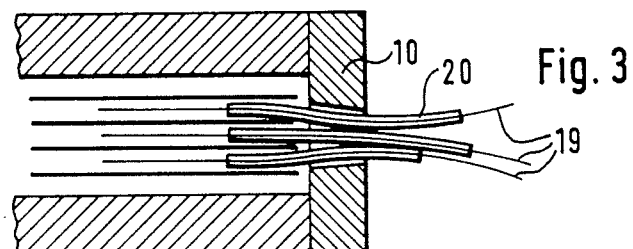
FIG. 3 illustrates a view similar to FIG. 2 but with optical fiber elements projecting differently.
Figure 4:
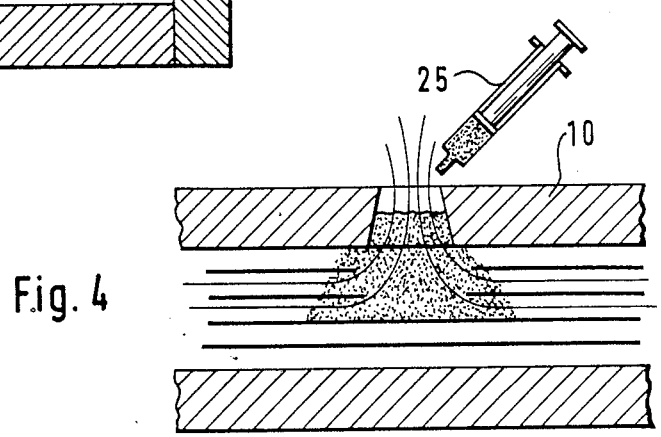
FIG. 4 illustrates a cross-section through equipment that demonstrates a step in the process in conjunction with FIG. 2 or 3 showing specifically the insertion of laminating resin.

In order to make sure that these slipped on teflon hoses retain their position they are being positioned and fixed by means of laminating resin in the transition portion (see FIG. 4). FIG. 2 illustrates a situation in which the fibers 19 are turned or bent about 90 degrees when run into bore 11; FIG. 3 illustrates basically the same kind of arrangement just the parts and lamina are different since obviously the procedure and the mounting assembly have to be adapted to the particular configuration of the construction part to be made, namely a straight through threading of the part 19, 20 through bore 11.

Upon manufacturing construction parts from and in the configuration of fiber reinforced compound material it has to be prevented that the Teflon hoses can pick up liquid resin during curing of the part as a whole. Therefore it is of advantage and prior to placing a pre-peg lamina onto the tool 10, to close the hose ends 20a which will become embedded, they are particularly closed with cold curing laminating resin. Preferably one will use a resin which is sufficiently resistant at autoclave temperature so that it will not become excessively fluid to flow. The resin can become soft which is immaterial as long as the softness does not reach an outright fluid state. The main point of course is to prevent further resin from entering the openings 20a of the Teflon hose 20.

Prior to curing a part in the autoclave it is necessary to close off the area of opening 18, using also a laminate resin which should enter some of the unoccupied portions of the conical bore 11. It was found that the resin as shown in FIG. 4 specifically should reach about 5 mm or so from the laminate structure in the conical bore 11. This way one makes sure that indeed the parts will be adequately prevented from flowing into the flow hoses. The filling of the area 18 and other opening portions may be carried out by an injection device 25. It is just necessary to make sure that a particular point of injection does not include suction or separating tissue so that whatever is being injected will positively adhere to the construction part.

The resin used of course must be compatible with the material of the compond part whereby the requirement exists that sufficient time is available for the cold resin to cure and will no longer be deformed in any material sense, following and during the curing in the autoclave.

Figure 5:
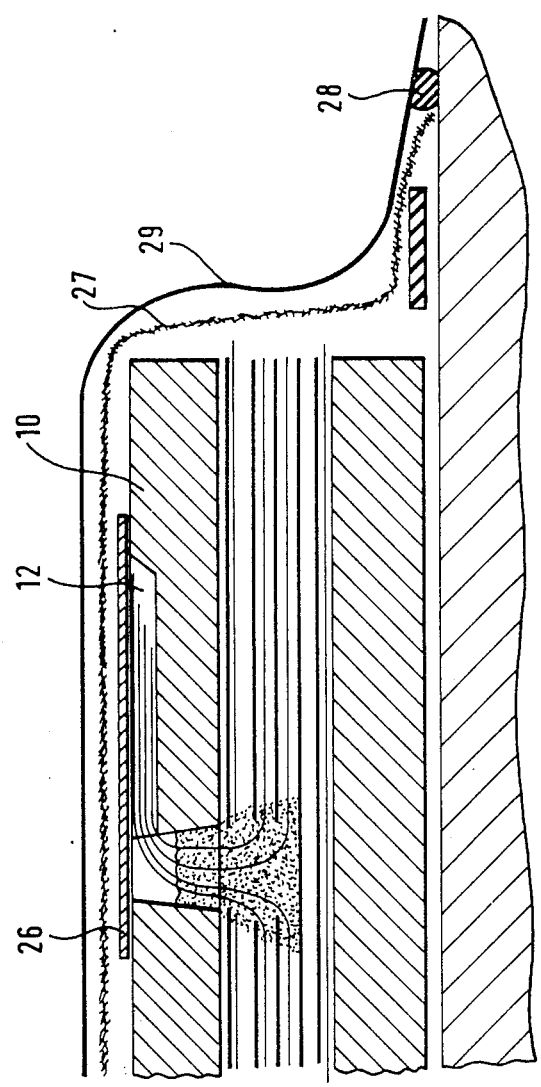
FIG. 5 illustrates somewhat schematically a part placed in an autoclave for purposes of curing and having been prepared in accordance with the preferred embodiment of the present invention pursuant to practicing the best mode thereof.

As shown in FIG. 5 the assembly specifically including the tool device 10 and the laminated part including the fibers 19 adhere to the extent they project from the openings in part 10 and being covered by respective Teflon hoses 20, will be placed into the recess 12 following the curing of the resin. Recess 12 is of course situated adjacent to the bore 11. Subsequently a cover 26 e.g. a sheet metal part is placed on top of tool 10. This way one avoids the application of pressure to the fibers during curing in an autoclave, and the fiber ends will not be damaged. The fibers will subsequently be connected through an interface device to an optical device such as an optical transmitter and/or receiver. FIG. 5 illustrates a compound part to be cured in the autoclave being of a fiber reinforced configuration and including a glass mesh 27 for covering it with additional covering provided with an autoclave foil 29 being sealed by means of a mass 28.

The invention is not limited to the embodiments described above but all changes and modifications thereof, not constituting departures from the spirit and scope of the invention, are intended to be included.

We claim:

1. Method for the protection of light conductive fiber ends, the fibers being embedded as crack monitors in fiber reinforced compound material comprising the steps of:

slipping the fiber ends into relatively short polytetrafluoroethylene hoses but being provided to be at least in part embedded in the compound material of which parts are to be made the fiber ends, projecting from the hose;

closing an end of the hose that will be embedded with a cold curing laminate resin without filling the hose;

partially embedding the fiber ends with enclosing polytetrafluoroethylene hoses to project from openings during assembly of the part and inserting the projecting fiber ends with said enclosing hoses in a conical bore of an assembly device;

filling said openings and portions adjacent to the conical bore of the assembly tool with laminate resins;

placing a protective cover onto said bore and over the polytetrafluoroethylene hose protected fiber end prior to curing of the part; and curing the thus prepared part in an autocave.

2. Method as in claim 1 wherein said assembly part with a conical bore is a support upon which the fiber reinforced parts are being assembled.

* * * * *